United States Patent
Schweitzer, III et al.

(10) Patent No.: US 7,123,459 B2
(45) Date of Patent: Oct. 17, 2006

(54) PROTECTIVE RELAY CAPABLE OF PROTECTION APPLICATIONS WITHOUT PROTECTION SETTINGS

(75) Inventors: Edmund O. Schweitzer, III, Pullman, WA (US); Tony J. Lee, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 340 days.

(21) Appl. No.: 10/409,355

(22) Filed: Apr. 7, 2003

(65) Prior Publication Data

US 2004/0196603 A1    Oct. 7, 2004

(51) Int. Cl.
*H02H 3/00* (2006.01)
(52) U.S. Cl. .......................... 361/62; 361/64
(58) Field of Classification Search ............. 361/62–69; 702/58, 59
See application file for complete search history.

(56) References Cited

U.S. PATENT DOCUMENTS

| | | | | |
|---|---|---|---|---|
| 4,538,196 A | * | 8/1985 | Sun et al. ...................... | 361/64 |
| 4,795,983 A | * | 1/1989 | Crockett et al. ............. | 324/521 |
| 4,896,241 A | * | 1/1990 | Li et al. ........................ | 361/66 |
| 5,793,750 A | * | 8/1998 | Schweitzer et al. ......... | 370/242 |

* cited by examiner

*Primary Examiner*—Stephen W. Jackson
*Assistant Examiner*—Danny Nguyen
(74) *Attorney, Agent, or Firm*—Cook Alex McFarron Manzo, Cummings & Mehler, Ltd.

(57) ABSTRACT

The current differential relay operates without adjustable settings, and includes a phase current differential element with a predetermined threshold, responsive to local phase current values and remote phase current values, to detect three-phase faults and producing a first output signal if the threshold value is exceeded. Either a negative sequence current differential element or two phase current differential elements, also having predetermined threshold values and responsive to the local and remote phase currents, detect phase-to-phase faults and phase-to-phase-to-ground faults and produces a second output signal if the predetermined threshold is exceeded. A negative sequence or zero sequence current differential current element, with a predetermined threshold value is responsive to the local and remote phase currents to detect phase-to-ground faults and to produce a third output signal if the threshold is exceeded. If any one of the first, second and third output signals occurs, a trip signal is generated and directed to the associated circuit breaker. The thresholds are selected to permit use of the relay in a wide range of possible applications.

16 Claims, 2 Drawing Sheets

PROTECTIVE RELAY CAPABLE OF PROTECTION APPLICATIONS WITHOUT PROTECTION SETTINGS

TECHNICAL FIELD

This invention relates generally to protective relays for electric power systems, and more particularly concerns a current differential relay without conventional adjustable settings which is useful in the protection of a power system.

BACKGROUND OF THE INVENTION

Historically, digital protective relays have had an adjustable "settings" capability, which enables a protection engineer to customize the operation of a protective relay to a particular protection task in a power system. This is often a challenging exercise. For example, with a conventional overcurrent relay, the protection engineer must first determine the expected fault current and the maximum load current of the power system at the point in the system where the relay is connected. The protection engineer then establishes the operating settings of the overcurrent relay to provide a trip signal when the currents it measures from the power line reach a predetermined level above the maximum load current but below the anticipated fault current.

The determination of the anticipated fault current involves a rather complex calculation, which takes into account the source strength and voltage, the impedance of downstream transformers and the impedance of the line from the relay out to the end of the protection zone covered by the relay. In addition, the protection engineer must also often coordinate the relay which is being set with other protective relays, located both closer to the source and closer to the load than the relay being set. Further, if the line protected by the relay being set can provide power and serve load in both directions from the protective relay, the setting task becomes even more complicated.

The setting task also becomes more complicated when the protection engineer must coordinate the protection provided by the relay being set with other protective relays set by another entity, an example being when utilities connect their respective power tie lines together or when utilities connect to heavy industrial loads having privately owned generators. Such connections are typically referred to as "interties". The relays at both ends of the intertie line portion must work together as a unit to properly protect the intertie; hence, their respective settings must be coordinated for proper operation and to prevent a malfunction, which can occur in the event of a miscalculation or misapplication of a relay at either end of the intertie.

Accordingly, it is desirable for a protective relay to be able to protect a variety of electric power arrangements and configurations without the need to calculate and apply protective relay settings. Further, it would be desirable to simplify the protection of an intertie line portion to prevent misoperation of the protection.

SUMMARY OF THE INVENTION

Accordingly, one aspect of the present invention is a current differential protective relay without adjustable operational settings for protecting a selected line portion of a power system, comprising: at least one phase current differential element, having a first predetermined, fixed threshold value, responsive to phase currents from the power system at a local location of the protective relay and to phase currents from a remote relay on the selected line portion to detect three-phase faults on the line portion and for providing a first output signal when said predetermined threshold is exceeded by three-phase current; a negative sequence differential element or two phase current differential elements, having a second predetermined, fixed threshold value, responsive to said local phase currents and said remote phase currents or current values determined therefrom to detect phase-to-phase faults and phase-to-phase-to-ground faults and for providing a second output signal when said second predetermined threshold is exceeded, wherein said two phase current differential elements either include said one phase current differential element for detecting three-phase faults or comprise two additional phase current differential elements; and a negative sequence differential element or a zero sequence differential element, having a third predetermined, fixed threshold value, also responsive to said local phase currents and said remote phase currents or currents determined therefrom to detect individual phase-to-ground faults and for providing a third output signal when said third predetermined threshold is exceeded, wherein if a negative sequence element is used, it is either the negative sequence element used for detecting phase-to-phase and phase-to-phase-to-ground faults or a second negative sequence element.

A second aspect of the present invention is a protective relay for current differential protection for a selected power line, comprising: a local current differential relay for protection of a selected power line portion of a power system, the local current differential relay having the capability of sampling three-phase currents from its local location on the power line at selected intervals of time and transmitting them to a remote relay also connected to the selected power line portion for current differential protection, wherein the remote relay is not operationally coordinated with said local current differential relay for protection functions; and a sensing function in the local current differential relay for determining when said relay is connected to a remote relay which has adjustable settings for fault determination, wherein the local differential relay, upon such determination, disables any protection functions therein while continuing to provide phase current values to the remote relay and to receive trip commands from the remote relay.

BEST MODE FOR CARRYING OUT THE INVENTION

Figure 1:
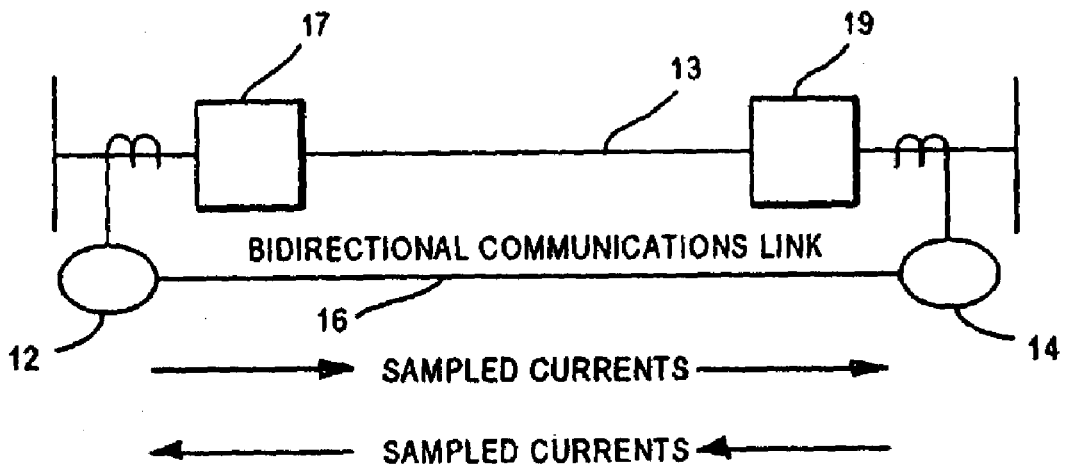
FIG. 1 is a diagram of a simple arrangement of a current differential relay system.

The present invention is a current differential relay without the capability of, or the need for, conventional adjustable settings. In current differential protection, referring to FIG. 1, a "local" relay 12 at one end of a protected portion 13 of a power line obtains phase currents (A, B and C phases) from the power line at that location and further receives such currents obtained by a relay at a remote end of the line, referred to as a remote relay 14. The sum of these remote and local currents is then compared with a "pickup" setting established for the particular application. Bi-directional communication occurs over a link 16, with sampled currents flowing in both directions. Circuit breakers 17 and 19 are responsive to the relays 12 and 14 to protect the line. Conventional current differential protection can also be accomplished by phase comparison of the current signals between the relative phases of the remote and local currents, and further, charge comparison, in which the area under the sine wave of the current waveforms at the local and remote ends of the protected line are compared to reach a trip decision.

The present invention is a current differential relay having the capability of detecting all fault types without adjustable settings. Several individual conventional current differential elements are combined to detect the various fault types.

First, a conventional phase current differential element is used to detect faults involving all three phases of a power system, generally referred to as three-phase faults. Phase current differential elements operate on the phase currents (A, B, C) of the power signal. Three-phase faults flow through relatively small impedances, such that the fault currents will be relatively large. For example, a power system, which is capable of delivering 5 amps of load current, will typically deliver 20 amps or more of fault current due to a three-phase fault. Typically, a single conventional phase current differential element is used for this, or alternatively, three different elements are used, one for each phase current.

A predetermined threshold is selected for the phase current differential element so that it will reliably detect three-phase faults for a large range of power system application possibilities. Such a threshold might be 1 amp when the power system is capable of delivering 5 amps of load current at the input of the protective relay.

Second, the zero setting relay of the present invention also protects phase-to-phase faults (A–B, B–C and C–A), as well as phase-to-phase-to-ground faults. This is accomplished by using either a conventional negative sequence differential element, or two conventional phase current differential elements. Negative sequence current is determined conventionally via a well-known calculation/determination from the three measured phase currents. The alternative two phase current differential elements can either include the phase current differential element used to detect three-phase faults and one additional phase current differential element, or they can be two additional phase current differential elements.

Two-phase faults also, like three-phase faults, create relatively large fault currents. It is thus possible to select a predetermined threshold for the negative sequence current differential element or the phase current differential elements so that they will reliably detect phase-to-phase or phase-to-phase-to-ground faults for a large range of possible power system relay applications. For instance, a threshold of 1 amp could be selected, when the power system is capable of delivering 5 amps of load current to the protective relay.

Third, the relay of the present invention uses a negative sequence current differential element or a zero sequence current differential element to detect phase faults involving ground, i.e. single phase-to-ground faults (A-ground, B-ground and C-ground). Since single phase-to-ground faults often exhibit relatively high impedance, i.e. high resistance to current flow, the fault currents generated are often small compared to the load current that can be delivered by the power system. Such faults are typically called high impedance or high resistance faults. The negative sequence and zero sequence differential currents determined by the current differential relay when there is no power system fault are primarily due to line charging current imbalance. Because the line charging current is very small compared to the load currents which can be delivered by the power system, the negative sequence or zero sequence differential current elements can have a very low operational threshold relative to the load current.

Zero sequence current differential elements are also well known, operating on zero sequence current, which again is a conventional determination obtained from measured phase currents.

In one embodiment, a single negative sequence element can be used to detect phase-to-ground faults and also phase-to-phase and phase-to-phase-to-ground faults.

Because negative sequence and zero sequence current differential elements can be established with very low thresholds relative to the load current, it is possible to select a threshold for those elements such that they will reliably detect single phase-to-ground faults for a large range of possible power system applications. Such a threshold in one embodiment might be, for instance, 0.5 amps, if the power system is capable of delivering 5 amps of load current at the input to the protective relay.

Hence, in one embodiment of the zero setting relay of the present invention one conventional phase current differential element for detecting three-phase faults is combined with a negative sequence differential current element for detecting phase-to-phase, phase-to-phase-to-ground and phase-to-ground faults for all three (A, B and C) phases. Both the phase current differential element and the negative sequence current differential element have prefixed thresholds.

The thresholds for the current differential elements are set at the factory, and are hence not adjustable by the protection engineer for a particular application. The thresholds are designed to protect a wide range of possible power system applications, within which the relay will operate properly to detect faults. Hence, there is no opportunity for an erroneous setting to cause a misoperation of the relay.

As alternative embodiments, two phase current differential elements could be used for protection against three-phase faults and phase-to-phase and phase-to-phase-to-ground faults, or one phase current differential element could be used for three-phase faults and two other phase current differential elements (for a total of three) for phase-to-phase and phase-to-phase to ground faults. In such embodiments, a negative sequence or zero sequence current differential element could be used to detect phase-to-ground faults. In still another alternative, a phase current differential element could be used for three-phase faults, a negative sequence element could be used for phase-to-phase faults, and another negative sequence element or zero sequence element could be used for phase-to-ground faults.

Figure 2:
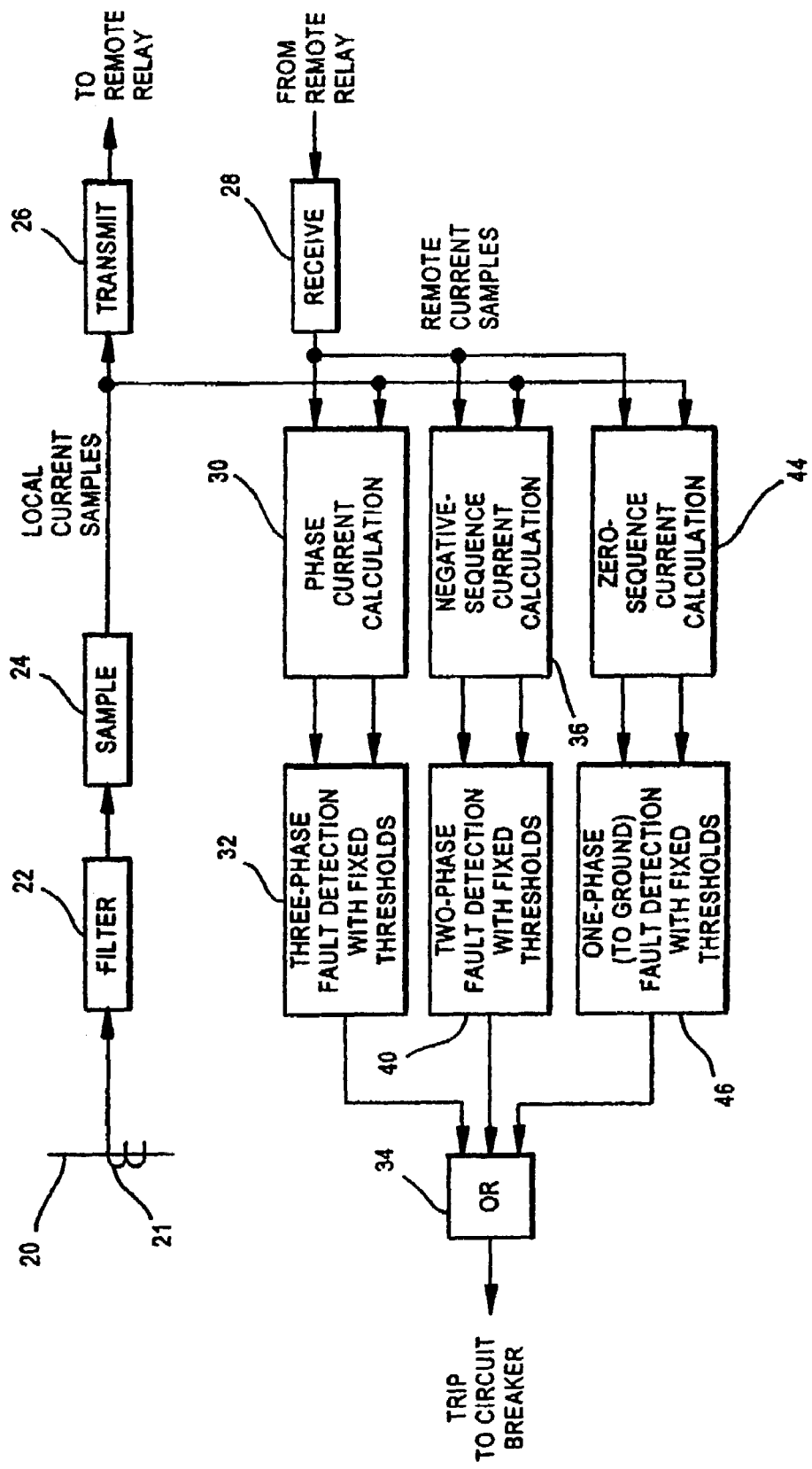
FIG. 2 is a block diagram showing the system of the present invention.

One particular combination is shown in FIG. 2. The three phase currents (A, B and C) are obtained from a power line 20 at the local relay through a power transformer 21 and then filtered at block 22. The filtered currents are then sampled, in a conventional manner, at block 24 and transmitted at block 26 to a remote relay. The local relay receives similar phase current values from the remote relay at 28.

The local phase currents and the remote phase currents are then each applied to three calculation circuits, as shown. The first calculation circuit 30 results in a phase current determination (where the local and remote phase current values are added) with the results applied to a three-phase fault detection circuit 32 with fixed thresholds, as discussed above, such as by a phase current differential element or elements. If the fixed threshold is exceeded, an output signal from circuit 32 is applied to an OR gate 34.

A second calculation circuit 36 in FIG. 2 is a negative sequence current calculation circuit (although it could be a phase current determination circuit as well, as discussed above). The output of circuit 36 is applied to a phase-to-phase and phase-to-phase-to-ground fault detection circuit 40, using a negative sequence current element. If the fixed threshold of the negative sequence element is exceeded, an output signal from circuit 40 is applied to OR gate 34.

Third, the local and remote phase current values are applied to a zero sequence calculation circuit 44 (in the zero sequence current embodiment), the output of which is applied to a single phase-to-ground fault detection circuit 46, using a zero sequence current differential element with a fixed threshold. If the threshold is exceeded by any of the phase-to-ground currents, an output signal from circuit 46 is applied to OR gate 34.

If there are one or more output signals applied to OR gate 34, an output from OR gate 34 occurs, which is then applied as a trip signal to the associated circuit breaker.

Hence, the present invention is a current differential relay having a wide fault protection capability for a wide range of protection applications, without the need for settings by a protection engineer for a particular application. Potential misoperations due to incorrect settings are thus avoided.

Figure 3:
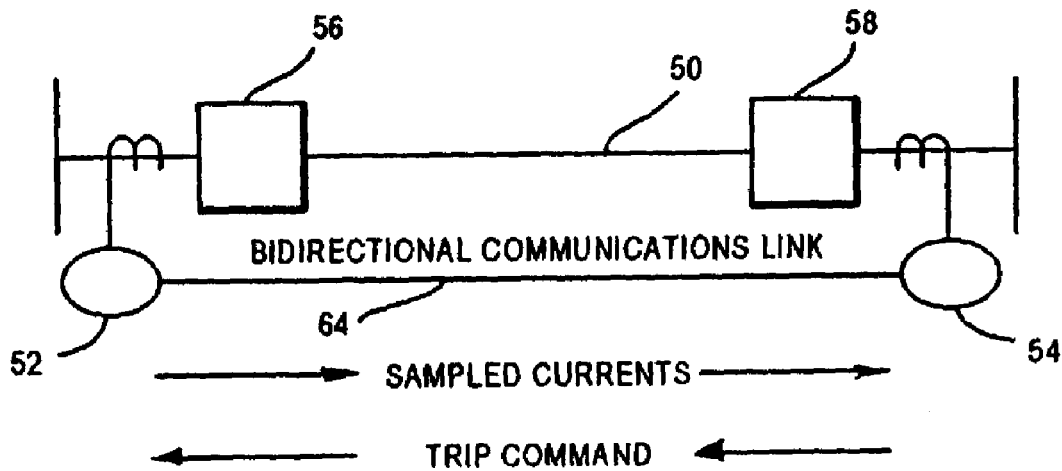
FIG. 3 is a simplified diagram showing a conventional intertie arrangement.

As also discussed above, another challenge for the protection engineer is the intertie situation in which the protection engineer has access to only one end of the intertie line portion. This is illustrated in FIG. 3, in which an intertie line portion 50 is protected by a zero setting current differential relay 52 on one end of the protected line and a traditional adjustable setting current differential relay 54 on the other end of the line. Circuit breakers 56 and 58 are located at the respective ends of the intertie line. The relays 52 and 54 are connected by a bidirectional communication link 64.

As stated above, the challenge for the protection engineer is that when setting changes are made at one relay end of the intertie, operation of the protection scheme may be changed to some extent, resulting in a possible risk of misoperation. Using a zero setting relay 52 at one end of the intertie can help to resolve this particular issue, if that relay in addition is designed to sense, i.e. determine, when it is in fact connected to a conventional current differential relay with adjustable settings, such as shown for the intertie of FIG. 3. In the present invention, when relay 52, with no (zero) adjustable settings, does sense such a connection, it will disable itself from performing current differential protection and will only function to sample the local currents and transmit them to the traditional current differential relay with adjustable settings and to receive a trip command from the other relay.

Relay 52 can make such a determination if the traditional relay, i.e. relay 54, is designed to transmit a particular, recognizable signal to the local relay 52. The recognizable signal can take various forms, including for example a particular bit in a data packet or a particular pattern in a data packet. Even a particular format for the data packet can be used, as well as other arrangements. Once the zero setting relay 52 determines it is connected to such a conventional relay, it is designed to go into its non-protection mode. In operation, it will then only determine and transmit local currents to the remote relay, in conventional fashion, such as carried out by elements 21, 22, 24 and 26 of FIG. 2. The conventional adjustable settings relay 54 will use the currents received from the non-protection-functioning zero setting relay 52 along with its own locally measured currents to perform traditional current differential protection, with its own customized settings. If relay 54 determines that a fault exists, it will first trip its local circuit breaker 58 and will also send a trip command signal to the zero setting relay 52. When relay 52 receives the signal, it will trip its own associated circuit breaker 56.

Even though the zero setting relay 52 does not provide any protection functions, it will trip at the same time or shortly after the time when the traditional current differential relay 54 trips its circuit breaker due to relay 54 transmitting a trip command. The zero setting relay 52 thus in effect operates in accordance with the settings of the remote relay 54. Accordingly, there will be no misapplication or misoperation of the overall current differential relay system due to misapplied or miscalculated settings in relay 52.

Alternatively, it should be understood that relay 52, while shown as a zero setting relay as discussed above, could also be a conventional current differential relay with adjustable settings, if it is programmed and designed so that when it senses a connection with another conventional adjustable setting relay on an intertie application, it disables its own protection functions and operates only to obtain current samples and transmit them to the remote relay, as well as receiving any trip commands from the remote relay and thereafter tripping its associated circuit breaker.

Still further, the relay 52 could be a completely non-protection-function capable device, in effect a teleprotection terminal capable only of obtaining local current values, transmitting them to the remote intertie relay and receiving back trip commands from the remote relay. Such a terminal is still, however, referred to as a relay for the purposes of this application.

Finally, although the application is disclosed in the context of an intertie connection, it could be used in any situation where there is no control over the settings of the remote relay.

Accordingly, a system has been disclosed and claimed which in one case is capable of detecting a wide variety of faults in a wide range of applications in a power system, without the need for adjustable settings, i.e. a zero setting relay.

In addition, the potential for mismatch in settings for an intertie or similar line portion is overcome by an arrangement involving either a zero setting relay, a conventional relay, or a "relay" in the form of a teleprotection terminal which, when a connection to a conventional, adjustable setting relay is determined, disables its own protection functions, if it has any, provides only sampled current values to the remote relay, and receives only trip commands from the remote relay.

Although a preferred embodiment of the invention has been described for purposes of illustration, it should be understood that various changes, modification and substitutions might be incorporated in the embodiment without departing from the spirit of the invention, which is defined in the claims, which follow.

What is claimed is:

1. A protective relay for current differential protection for a selected power line, comprising:

a local current differential relay for protection of a selected power line portion of a power system, the local current differential relay having the capability of sampling three phase current values from its location on the power line at selected intervals of time and transmitting them to a remote relay also connected to the selected power line for current differential protection, wherein the remote relay is not coordinated with said local current differential relay for protection functions; and a sensing function in the local current differential relay for determining when said relay is connected to a remote relay which has adjustable settings for fault determination, wherein the local current differential relay, upon such determination, disables any protection functions therein while continuing to provide phase current values to remote relay and to receive trip commands from the remote relay.

2. A system of claim 1, wherein the sensing function is responsive to a signal from the remote relay, indicating that it has adjustable settings.

3. A system of claim 2, wherein said signal is part of a data packet sent by the remote relay to the current differential relay.

4. A system of claim 2, wherein the signal is part of the format of the data packet.

5. A system of claim 1, wherein the local current differential relay is a relay without an adjustable settings capability.

6. A system of claim 1, wherein the local current differential relay is a relay having an adjustable settings capability.

7. A system of claim 1, wherein the local current differential relay is not capable of providing any protection functions.

8. A system of claim 1, wherein the selected power line is an intertie.

9. A current differential protective relay without adjustable operational settings for use in protecting a selected line portion of a power system, comprising:
   a first phase current differential element, having a first predetermined, fixed threshold value, responsive to phase currents from the power system at a local location of the protective relay and to phase currents from the power system at a local location of the protective relay and to phase currents from a remote relay on the selected line portion, to detect three-phase faults on the line portion and for providing a first output signal when said predetermined threshold is exceeded by three-phase current;
   a second phase current differential element and a third phase current differential element, having a combined second predetermined, fixed threshold value, collectively responsive to said local phase currents and said remote phase currents to detect phase-to-phase faults and phase-to-phase-to-ground faults and for collectively providing a second output signal when said second predetermined threshold is exceeded; and
   a negative sequence current differential element or a zero sequence differential element, having a third predetermined, fixed threshold value, responsive to said local phase currents, and said remote phase currents to detect individual phase-to-ground faults and providing a third output signal when said third predetermined threshold is exceeded.

10. The protective relay of claim 9, wherein a negative sequence current differential element is used to detect individual phase-to-ground faults.

11. The protective relay of claim 9, wherein a zero sequence differential element is used to detect individual phase-to-ground faults.

12. A current differential protective relay without adjustable operational settings for use in protecting a selected line portion of a power system, comprising:
   at least one phase current differential element, having a first predetermined, fixed threshold, but no adjustable operational setting capability, responsive to phase currents from the power system at a local location of the protective relay on the selected line portion and to phase currents from a remote relay on the selected line portion to detect three-phase faults on the line portion and for providing a first output signal when said first predetermined threshold is exceeded by three phase current;
   a negative sequence current differential element responsive to negative sequence current values or at least one additional phase current differential element, having a second predetermined, fixed threshold value, but no adjustable operational setting capability, responsive to signals related to said local phase currents and said remote phase currents to detect phase-to-phase and phase-to-phase-to-ground faults and for providing a second output signal when said second predetermined threshold is exceeded; and
   a negative sequence current differential element responsive to negative sequence current values or a zero sequence current element responsive to zero sequence current values, having a third predetermined, fixed threshold value, but no adjustable operational setting capability, responsive to signals related to said local phase currents and said remote phase currents to detect phase-to-ground faults and for providing a third output signal when said third predetermined threshold is exceeded.

13. The protective relay of claim 12, wherein a negative sequence current differential element is used to detect phase-to-phase and phase-to-phase-to-ground faults.

14. The protective relay of claim 12, wherein at least one additional phase current differential element is used to detect phase-to-phase and phase-to-phase-to-ground faults.

15. The protective relay of claim 12, wherein a negative sequence current differential element is used to detect phase-to-ground faults.

16. The protective relay of claim 12, wherein a zero sequence current element is used to detect phase-to-ground faults.

* * * * *

UNITED STATES PATENT AND TRADEMARK OFFICE
CERTIFICATE OF CORRECTION

PATENT NO.        : 7,123,459 B2                                         Page 1 of 1
APPLICATION NO.   : 10/409355
DATED             : October 17, 2006
INVENTOR(S)       : Edmund O. Schweitzer, III and Tony J. Lee It is certified that error appears in the above-identified patent and that said Letters Patent is hereby corrected as shown below:

Col. 7, lines 31-34
The phrase "phase currents from the power system at a local location of the protective relay and to" is duplicated in claim 9. Accordingly, the second instance of the phrase is hereby deleted.

Signed and Sealed this

First Day of September, 2009

David J. Kappos
*Director of the United States Patent and Trademark Office*